US010017951B2

(12) United States Patent
Youngborg (10) Patent No.: US 10,017,951 B2
(45) Date of Patent: Jul. 10, 2018

(54) METHOD OF USING A PANEL FRAMING DEVICE TO BUILD PANELS FOR USE IN HOUSE CONSTRUCTION (71) Applicant: Paul Youngborg, Encinitas, CA (US)

(72) Inventor: Paul Youngborg, Encinitas, CA (US)

(*) Notice: Subject to any disclaimer, the term of this patent is extended or adjusted under 35 U.S.C. 154(b) by 0 days.

(21) Appl. No.: 15/668,309

(22) Filed: Aug. 3, 2017

(65) Prior Publication Data
US 2018/0038121 A1 Feb. 8, 2018

Related U.S. Application Data (60) Provisional application No. 62/371,793, filed on Aug. 7, 2016, provisional application No. 62/374,816, filed on Aug. 13, 2016, provisional application No. 62/421,871, filed on Nov. 14, 2016.

(51) Int. Cl.
E04G 21/18 (2006.01)
B23Q 16/00 (2006.01)
B23Q 1/03 (2006.01)
B23Q 16/02 (2006.01)

(52) U.S. Cl.
CPC ......... E04G 21/1891 (2013.01); B23Q 1/032 (2013.01); B23Q 16/001 (2013.01); B23Q 16/021 (2013.01)

(58) Field of Classification Search
CPC .... B23Q 16/001; B23Q 16/021; B23Q 1/032; E04G 21/16; E04G 21/1891
USPC .......................................... 33/494, 407, 417
See application file for complete search history.

(56) References Cited

U.S. PATENT DOCUMENTS

| 2,187,087 | A | | 1/1940 | Leary | |
|---|---|---|---|---|---|
| 4,301,596 | A | * | 11/1981 | Sedlock | G01B 3/02 33/494 |
| 4,367,590 | A | * | 1/1983 | Winter | G01B 3/02 33/562 |
| 4,845,858 | A | | 7/1989 | Thomas | |
| 4,942,670 | A | * | 7/1990 | Brandt | E04G 21/1891 33/494 |
| 5,012,590 | A | | 5/1991 | Wagner | |
| 5,107,601 | A | | 4/1992 | Semchuck | |
| 5,627,763 | A | | 5/1997 | Carlson | |
| 6,360,448 | B1 | * | 3/2002 | Smyj | E04G 21/1891 33/434 |
| 6,494,014 | B2 | * | 12/2002 | Lafrance | G01B 3/02 33/494 |
| 6,766,282 | B1 | | 7/2004 | Schettine | |
| 7,059,061 | B2 | * | 6/2006 | French | E04G 21/1891 33/194 |
| 7,373,731 | B2 | | 5/2008 | Nyberg | |

(Continued)

Primary Examiner — Yaritza Guadalupe-McCall
(74) Attorney, Agent, or Firm — Eric Hanscom (57) ABSTRACT This invention is directed toward a panel framing device. The device comprises a portable framing table that can be driven in a trailer to remote locations and a pre-printed roll of framing tape that is used to tell a worker where different parts of a framed panel will go. The goal of the device is to facilitate the building of structures using a panel approach, with the framing table and template tape minimizing the chances that a worker will make a mistake in either the selection of materials or the location of the materials. The technology can also be used to construct entire walls, which are then either transported to the site, or merely "tilted-up" into place, having been constructed on the slab.

10 Claims, 10 Drawing Sheets (56) References Cited

U.S. PATENT DOCUMENTS

| | | | |
|---|---|---|---|
| D572,156 S | 7/2008 | Payne | |
| 7,533,473 B2 | 5/2009 | Chua | |
| 8,225,521 B1* | 7/2012 | Mooney | G01B 3/1082 |
| | | | 33/194 |
| 8,448,348 B1 | 5/2013 | Jones | |
| 2001/0013178 A1 | 8/2001 | Lafrance | |
| 2001/0034954 A1* | 11/2001 | Medford | E04D 15/025 |
| | | | 33/759 |
| 2002/0095906 A1 | 7/2002 | Edmondson | |
| 2006/0096112 A1 | 5/2006 | Berring | |
| 2007/0011959 A1* | 1/2007 | Debene | E04G 21/1891 |
| | | | 52/105 |
| 2007/0271806 A1 | 11/2007 | Dressler | |
| 2008/0010910 A1* | 1/2008 | Baij | E04G 21/1891 |
| | | | 52/105 |
| 2008/0209749 A1* | 9/2008 | Chua | E04G 21/1891 |
| | | | 33/758 |
| 2017/0284112 A1* | 10/2017 | Elshani | E04G 21/1841 |
| 2018/0038120 A1* | 2/2018 | Youngborg | E04B 2/56 |
| 2018/0038121 A1* | 2/2018 | Youngborg | E04G 21/1891 |

* cited by examiner

METHOD OF USING A PANEL FRAMING DEVICE TO BUILD PANELS FOR USE IN HOUSE CONSTRUCTION

CROSS REFERENCE TO RELATED APPLICATIONS

This document claims the benefit of U.S. Prov. Pat. App. No. 62/371,793 filed on Aug. 7, 2016; U.S. Prov. Pat. App. No. 62/374,816 filed on Aug. 13, 2016; and U.S. Prov. Pat. App. No. 62/421,871 filed on Nov. 14, 2016, the entireties of which are hereby incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of construction equipment, and more specifically, to a method of using framing table upon which panels can be constructed, where a pre-printed roll of tape that can be laid upon the table that will facilitate where various parts of the frame will be located.

History of the invention's industry. Houses have been constructed in a modular or "component" fashion for some time. Rather than first framing the skeleton of a house and then adding the plumbing and electrical features, and finally covering it with an interior and an exterior covering, contactors have long appreciated the value of being able to build a series of framed panels which are then connected to other framed panels to construct a house.

There is some prior art on the field of the use of tapes, such as U.S. Pat. No. 5,627,763 to Carlson, which describes a method of using computers to create a "guidance tape." U.S. Pat. App. No. 2009/0277031 to Stocking teaches a method of building a house or office using full size templates on the sub floor. Another application, U.S. Pat. App. No. 2015/0168119 to French et. al. provides a measuring tape with a squaring function and a rough opening layout. U.S. Pat. App. 2002/0148134 to Meyer et. al. focuses on a tool useful in aligning members utilizing a roll of one-sided adhesive material to set locations for vertical studs.

U.S. Pat. App. 2002/0038518 to Barrows uses a tape to set locations on the top plate for framing. U.S. Pat. No. 8,225,521 to Mooney also teaches the use of a tape system in construction, as does U.S. Pat. No. 5,012,590 to Wagner et. al.

Constructing the actual framed panels, however, has proven problematic and expensive. One solution that is currently available on the market is a "framing table" that is permanently affixed in a warehouse, where the parts of a panel are laid out on the framing table and then connected to each other through electric staple guns and other devices. The panels are then transported to the building site where they are put together. This method, however, while producing useful panels, require that the entire panel be transported to the job site, and is much more complex and costly than is desirable. If, on the other hand, a portable framing table could be hauled to the job site, the panels could be built "on site" and easily assembled for production. This would also save considerably on transportation costs, as it is would require fewer trips. For example, using a portable framing table would require basically two trips: one to haul the framing table to the job site and another trip to haul the raw materials. Building the panels off-site, on the other hand, requires a number of trips to bring the finished panels to the job site after they have been produced.

Additionally, since often a job requires a change in plans, it would be much easier to make then changes at the job site and build a modified panel, see if the modified panel performs as required, then modify it again if needed. This would represent a considerable savings in terms of time and money than if they had to call the warehouse, have them make a new panel, ship the panel to the job site, then ship it back if it didn't work.

Another common problem with panel construction is that the plans are only as good as the attention to detail of the person making the panel. In Southern California, for example, many people who work in the construction trade do not speak or read English very well. Thus, they will occasionally make mistakes in following text on the plans.

The current invention solves this problem by teaching a method that uses a strip of paper, that has been pre-printed with a variety of indicia that notifies a construction worker of the exact location of each piece of the eventual panel. These strips are rolled out and attached to the framing table such that the panel is constructed with the strips of paper on the edges, such that the quality of the work can be easily checked for the panel before it is approved for use.

While a preferred embodiment of the invention calls for mating strips of tape to be put on the underside of the top plate and the upper surface of the bottom plate, the invention also contemplates the placement of the tape adjacent to the top plate and bottom plate, and even just laid out on a framing table or even on the ground.

SUMMARY OF THE INVENTION

Accordingly, one aspect the invention includes using a portable framing table which can be easily transported in a small utility trailer. The framing table is inexpensive to build compared to other, non-portable framing tables. The framing table is light enough to be easily removed from the trailer and carried by two workers to a desired location. Alternatively, the framing table can be rolled out of the trailer and transported by two workers through pushing to a desired location. The framing table additionally is designed to accept a length of template tape upon which the exact location of each item to be placed in the panel is to be located. The table is made from four pieces that are bolted together and light enough to be lifted and carried by two workers. The table, gantry with electric hoist, and gantry rails are held in place by metal bars to keep the assembly rigid and square.

Embodiments of the current disclosure include the use of a tape for panel construction, wherein the tape comprises a first half and a second half, where each half comprises indicia for placement of studs, a wall surface, a header, and fasteners, where the first half corresponds to a top plate, and where the second half corresponds to a bottom plate, where the indicia for placement of studs are mirrored between the first half and the second half. The indicia for placement of fasteners comprises indicia for placement of anchor bolts in the second half. The indicia for placement of fasteners may also or in the alternative comprise nailing instructions. The indicia are further for the placement of cripples and sills. The indicia are further for the placement of electrical boxes. The header is a pre-build header. The wall surface is an oriented strand board. The indicia are further for the placement of a backing board. The tape comprises a distortion-resistant material selected from the group consisting of Mylar, vinyl, paper, and cloth.

Other embodiments of the current disclosure include a method of constructing a panel comprising the steps of applying a tape along the length of a bottom plate, where the tape comprises indicia for placement of studs, a header, and fasteners; applying a second tape along the length of a top plate, where the second tape comprises indicia for placement of studs, a pre-build header, and fasteners; fastening the studs to the bottom plate according to the indicia on the tape; fastening the studs to the top plate according to the indicia on the second tape; and fastening the pre-build header to the bottom plate according to the indicia on the tape. The tape further comprises indicia for placement of an oriented strand board. The method further comprises the step of fastening the oriented strand board to one or more of the studs, the bottom plate, or both according to the indicia for placement of an oriented strand board. The tape further comprises indicia for placement of an electrical box. The method further comprises the step of fastening the electrical box to one of the studs according to the indicia for placement of an electrical box. The tape further comprises indicia for placement of an anchor bolt. The method further comprises the step of securing the bottom plate to a surface using an anchor bolt according to the indicia for placement of an anchor bolt. The tape further comprises indicia for placement of a backing board. The method further comprises the step of fastening the backing board to at least one of the studs according to the indicia for placement of an anchor bolt. The method further comprises the step of cutting the tape before it is applied to the bottom plate.

Further embodiments of the current disclosure include a tape for constructing a tilt-up wall panel, wherein the tape comprises two halves separated by a line, where each half comprises color-coded indicia for placement of studs, a wall surface, a pre-build header, and fasteners, where the indicia for placement of fasteners comprises nailing instructions, where one of the two halves corresponds to a top plate, and where other of the two halves corresponds to a bottom plate, where the indicia for placement of studs are mirrored between each of the halves, where at least one of the two halves further comprises indicia for placement of anchor bolts and electrical boxes.

As used herein, the term "wall surface" is a flat piece of material that is to be affixed to a constructed panel, such as an oriented strand board or drywall; and the term "tape" refers to a long strip of flexible material.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention. It is specifically contemplated that the framing table can be made from wood, aluminum and other metals, and fiberglass. It is also contemplated that a preferred embodiment of the template tape will be made of paper, but that Mylar, non-stretch fabric, nylon, polyester, metallic tape and plastic versions are also contemplated.

BRIEF DESCRIPTION OF THE FIGURES

The accompanying drawings, which are incorporated in and form a part of this specification, illustrate embodiments of the invention and together with the description, serve to explain the principles of this invention.

FIG. 1, including detailed

DETAILED DESCRIPTION OF THE FIGURES

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

Figure 1:
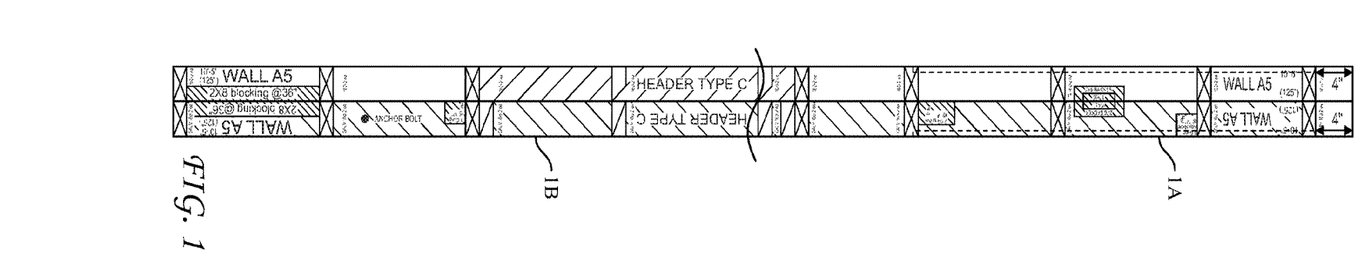
Figure 1A:
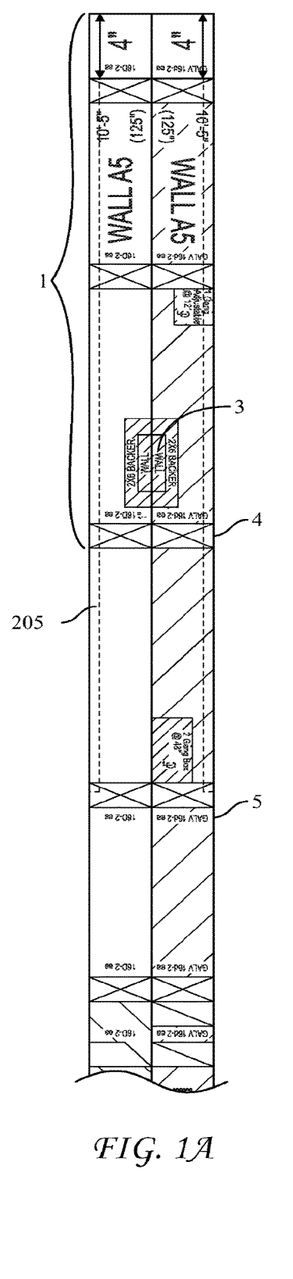
FIGS. 1A and 1B, are views of a representative section of tape according to selected embodiments of the current disclosure.
Figure 1B:
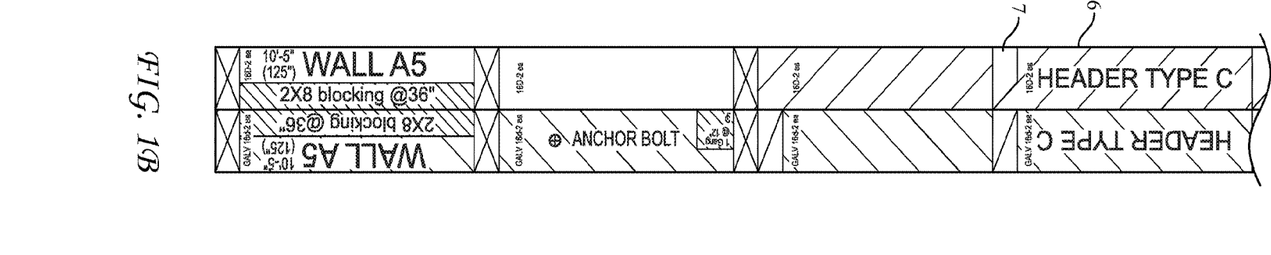

Reference Numbers used:
1. Tape, generally
2. OSB
3. Backing Board
4. Stud
5. Nailing directions
6. Pre-build header
7. Cripple 8. Top plate
9. Bottom plate
10. Sill
11. Electrical box
205. Location for wall surface FIG. 1 includes views of a representative section of tape. A length of tape, generally referenced as 1, contains a large number of useful items that can be used by a panel builder to properly locate the parts of a frame prior to actually putting the frame together. For example, in this figure, the locations for studs 4, cripples 7, and pre-build headers 5 are designated on the actual tape itself, so that a user of the invention merely lays down the tape on the top plate and bottom plate (each not shown in this figure), then line up the components ready for assembly. The tape even has nailing instructions 5, and locations for wall surfaces 205 and backing board 3.

It is contemplated that the tape will be made from paper, cardboard, Mylar, vinyl, cloth or another dimensionally stable material, and will feature color-coded symbols to designate different items, such that even a novice builder can put together a quality panel quickly, efficiently, and more important, correctly. First time, every time. Once a tape has been designed, it can be mass-produced to allow builders to construct one panel level, or on a building level, thereby lending itself to the mass production of like structures, such as that which can be found in low-income housing.

Figure 2:
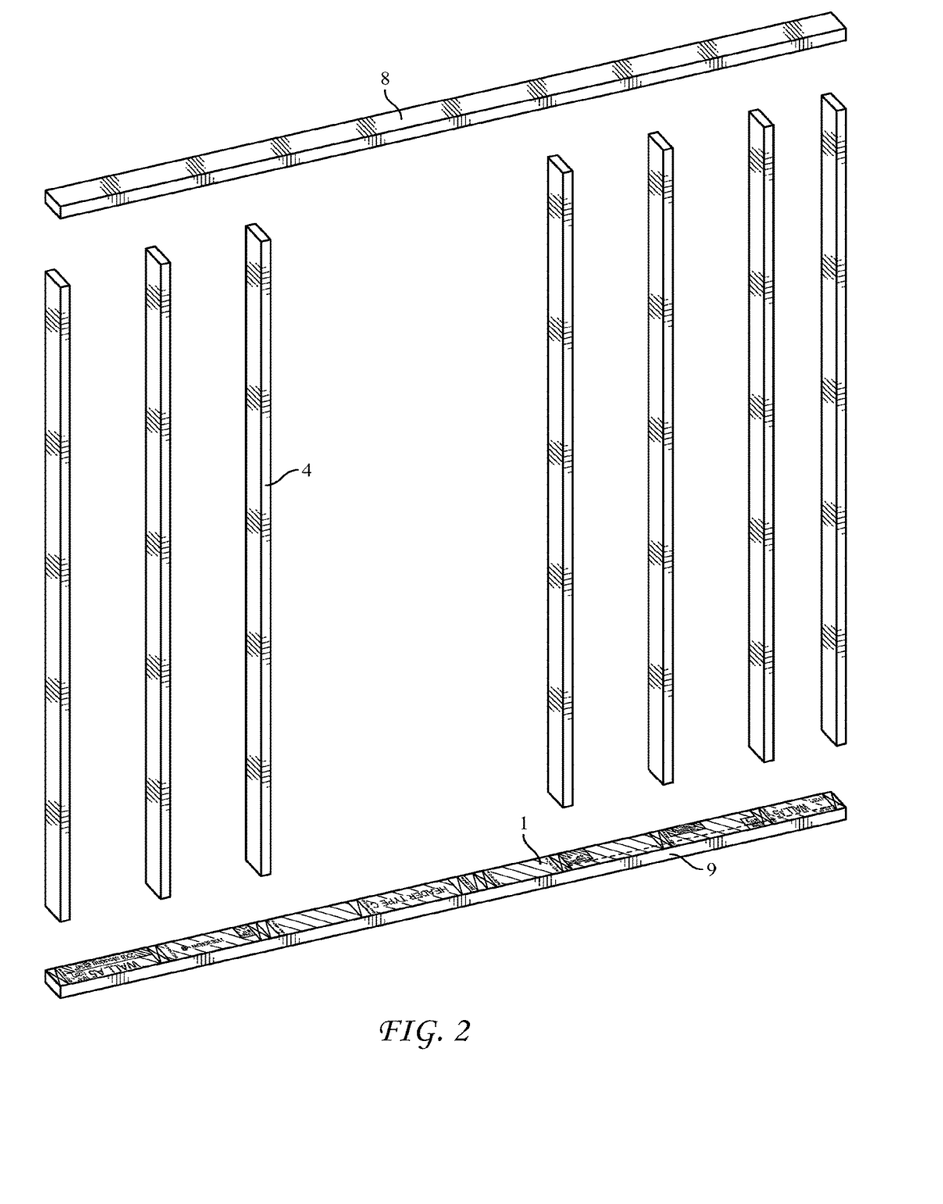
FIG. 2 is a perspective view of pieces of frame ready to be assembled according to selected embodiments of the current disclosure.

FIG. 2 is a perspective view of pieces of frame ready to be assembled according to selected embodiments of the current disclosure. A builder need only secure the tape 1 to the bottom plate 9 and on the underside of the top plate 8, and then the tape 1 tells the builder where to line up the studs 4, and even tells what kind of nails and how many are to be used at each junction.

Figure 3:
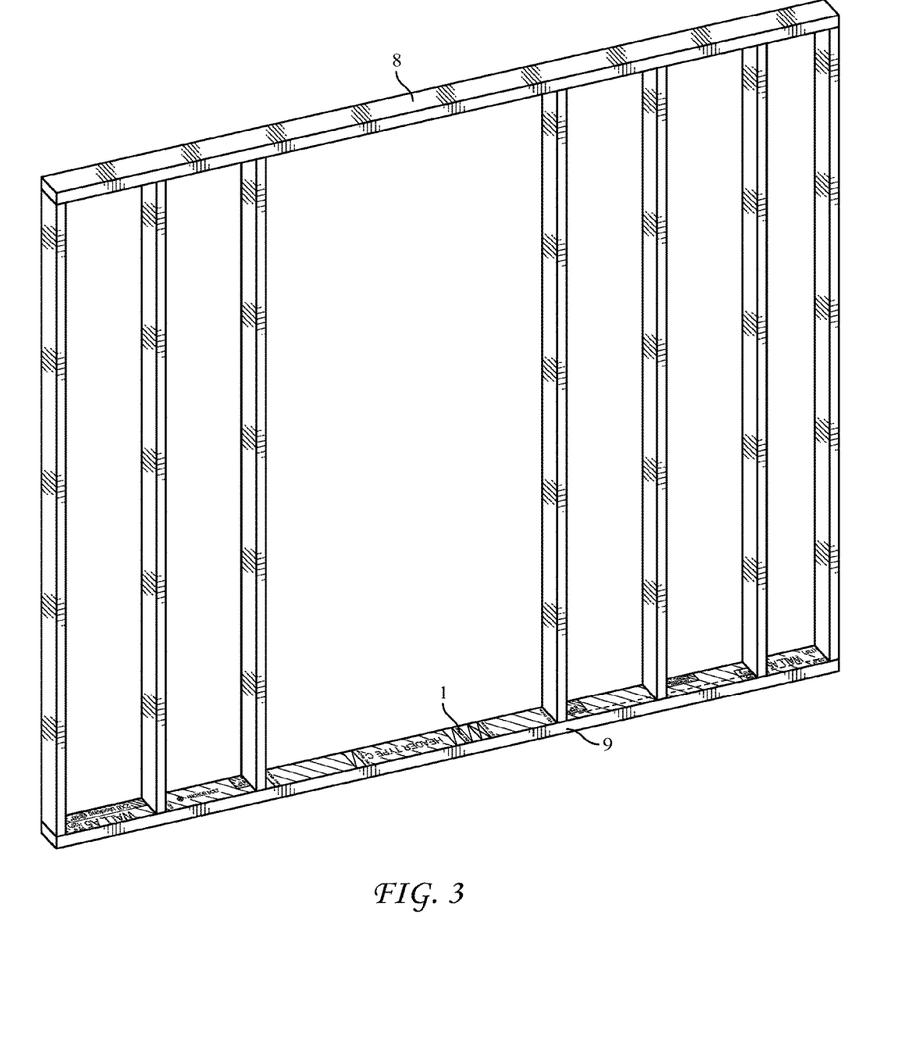
FIG. 3 is a perspective view of the frame assembled with the tape used to guide the construction process, according to selected embodiments of the current disclosure.

FIG. 3 is a perspective view of the frame assembled with the tape used to guide the construction process. Because the builder followed the clear directions on the tape 1, the studs 4 are in the correct position between the top plate 8 and bottom plate 9.

Figure 4:
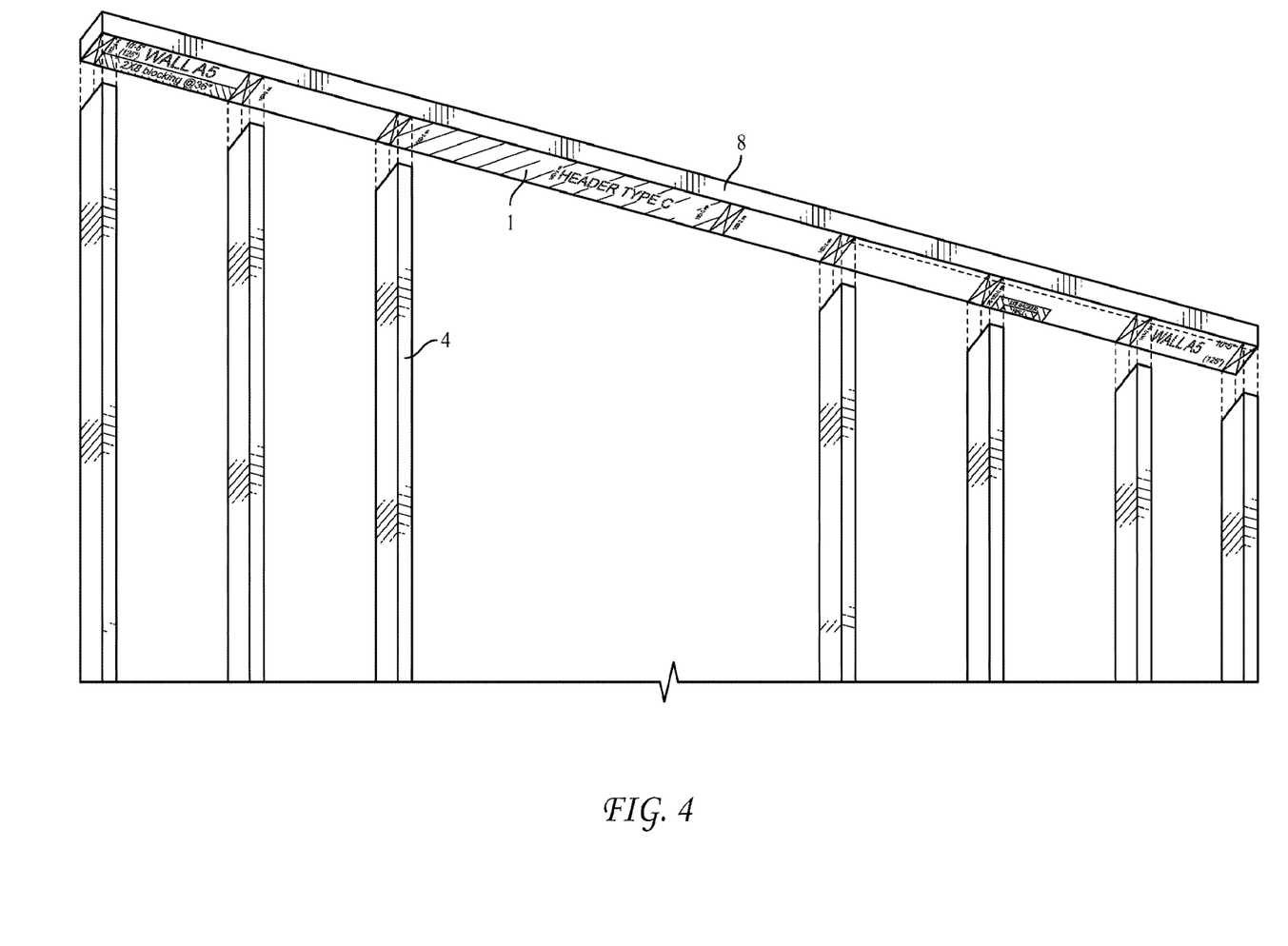
FIG. 4 is a perspective view of the points of connection between different parts of the frame according to selected embodiments of the current disclosure.

FIG. 4 is a perspective view of the points of connection between different parts of the frame. Once the tape 1 is laid down on the underside of top plate 8, it becomes apparent where to cut the top plate 8 and where to attach the studs 4.

Figure 5:
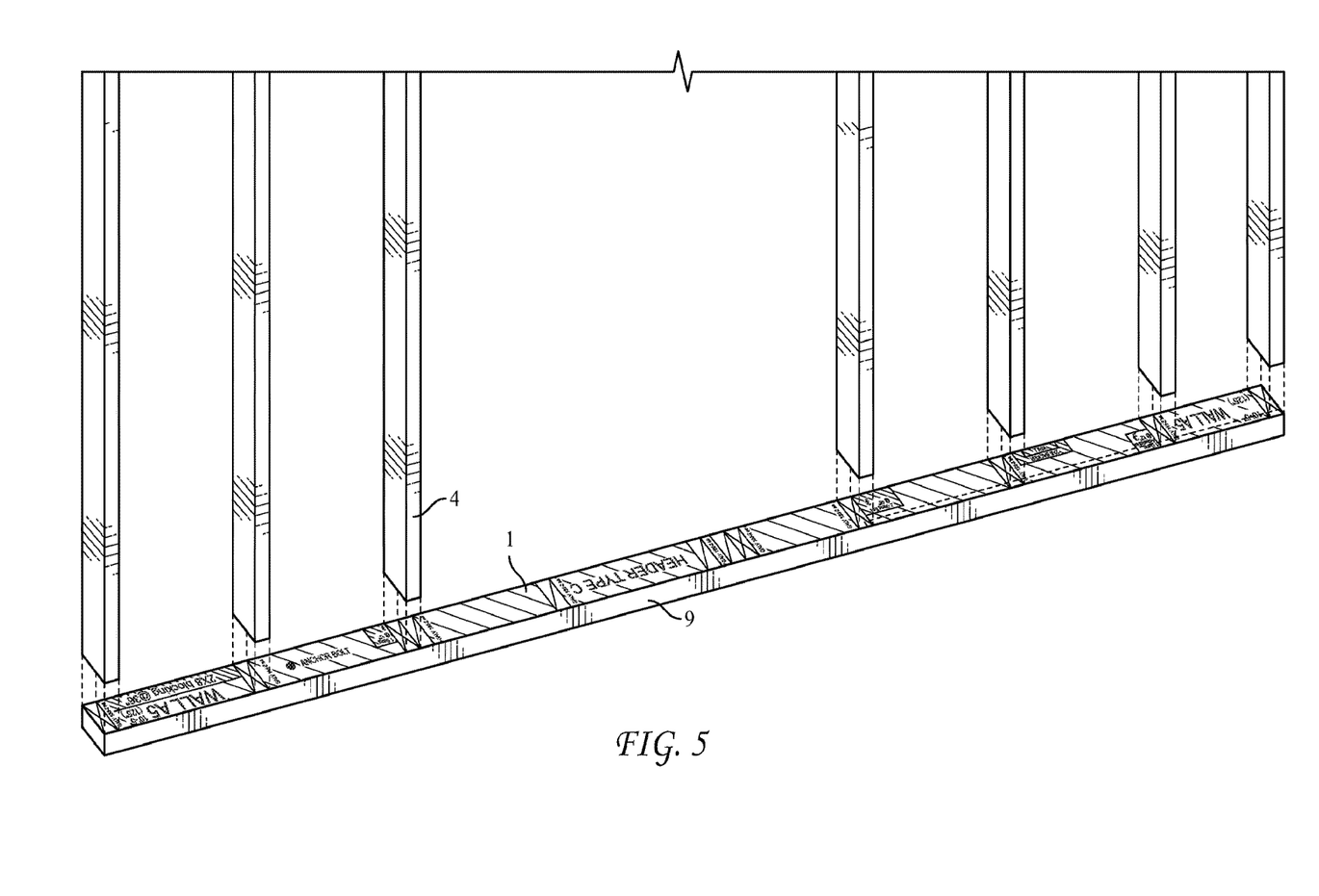
FIG. 5 is a perspective view of an assembled frame with the various component parts according to selected embodiments of the current disclosure.

FIG. 5 is a perspective view of an assembled frame with the various component parts. Once the tape 1 is laid down on the topside of bottom plate 9, it becomes apparent where to cut the top plate 9 and where to attach the studs 4. Using the tape 1 as a guide, the panel can be built on a table or pretty much any flat surface. Once the panel is built, it is easily transported to a construction site, if not constructed onsite.

Figure 6:
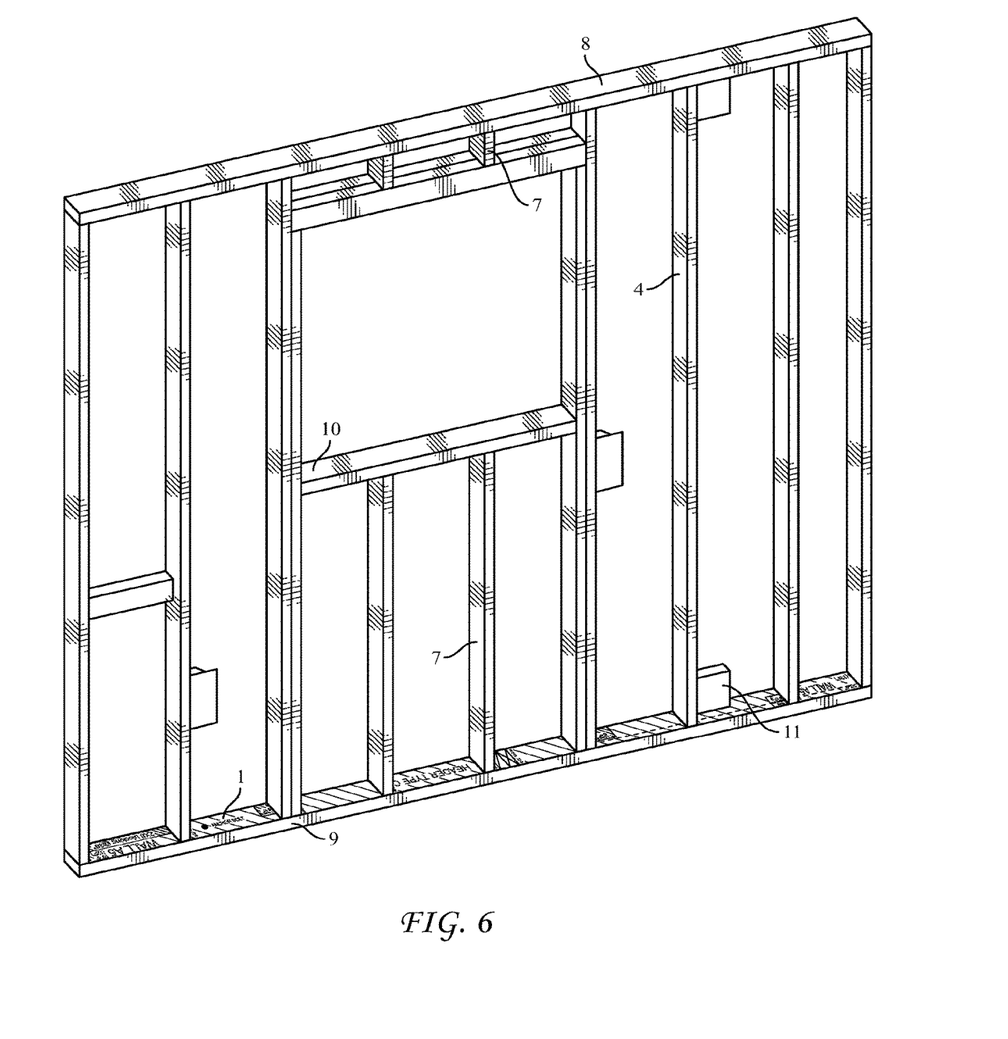
FIG. 6 is a perspective view of an assembled frame with the various component parts according to selected embodiments of the current disclosure.

FIG. 6 is a perspective view of an assembled frame with the various component parts. In this particular figure, the tape 1 on the bottom plate 9 and the underside of the top plate 8 has served as a guide where to put the studs 4, cripples 7, and even electrical boxes 11.

Figure 7:
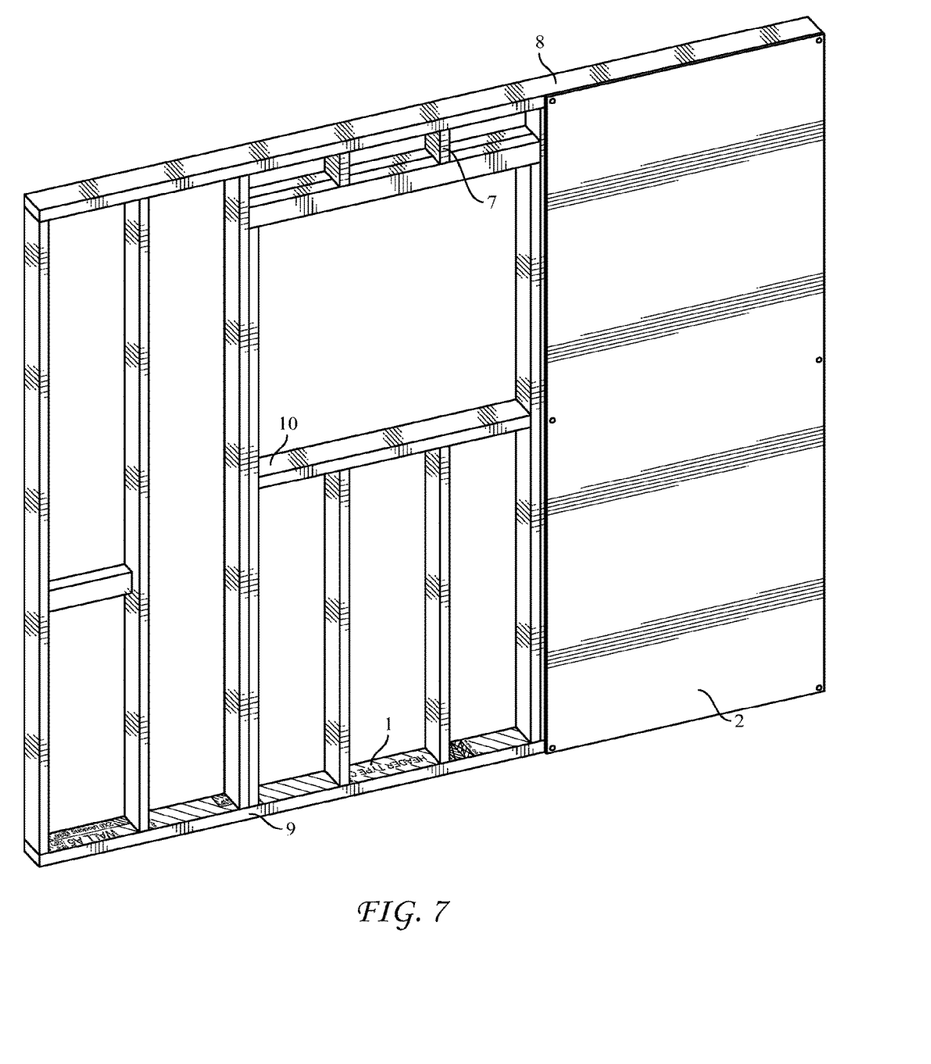
FIG. 7 is a perspective view of the frame after the addition of an OBS cover according to selected embodiments of the current disclosure.

FIG. 7 is a perspective view of the frame after the addition of an OBS cover 2. Note that even construction items located above the bottom plate 9 and below the top plate 8, such as a sill 10, can be specified on the tape 1.

Figure 8:
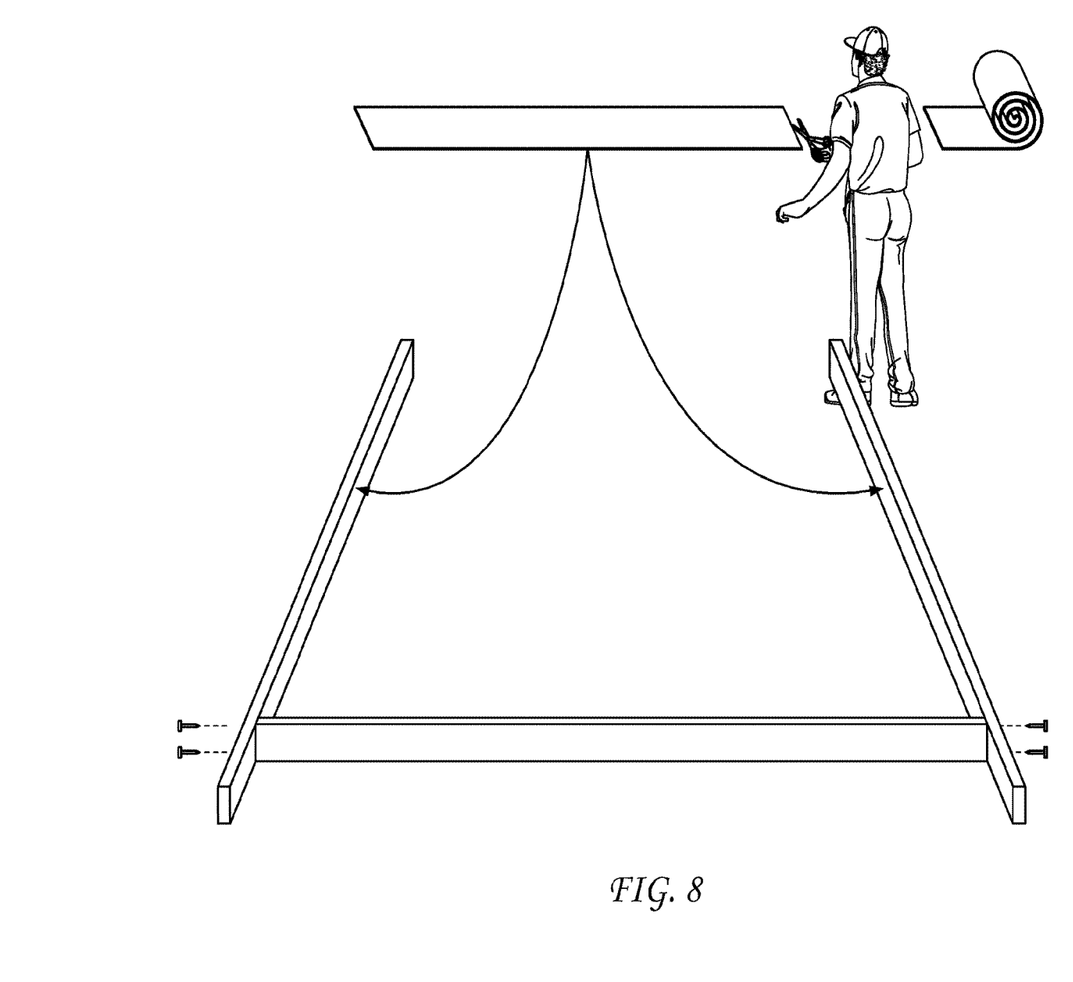
FIG. 8 is a stylized view of a person using the tape to prepare to build a frame according to selected embodiments of the current disclosure.

FIG. 8 is a stylized view of a person using the tape to prepare to build a frame according to selected embodiments of the current disclosure. The project begins with a person cutting the tape into the proper length. The builder will then attach the mating halves of the tape to the top plate and the bottom plate, so that he/she has a matching top and bottom to the panel. The builder will then place the top plate and the bottom plate on a flat surface, such as a table or a floor, and will begin to assemble the frame per instructions clearly written on the tape.

Figure 9:
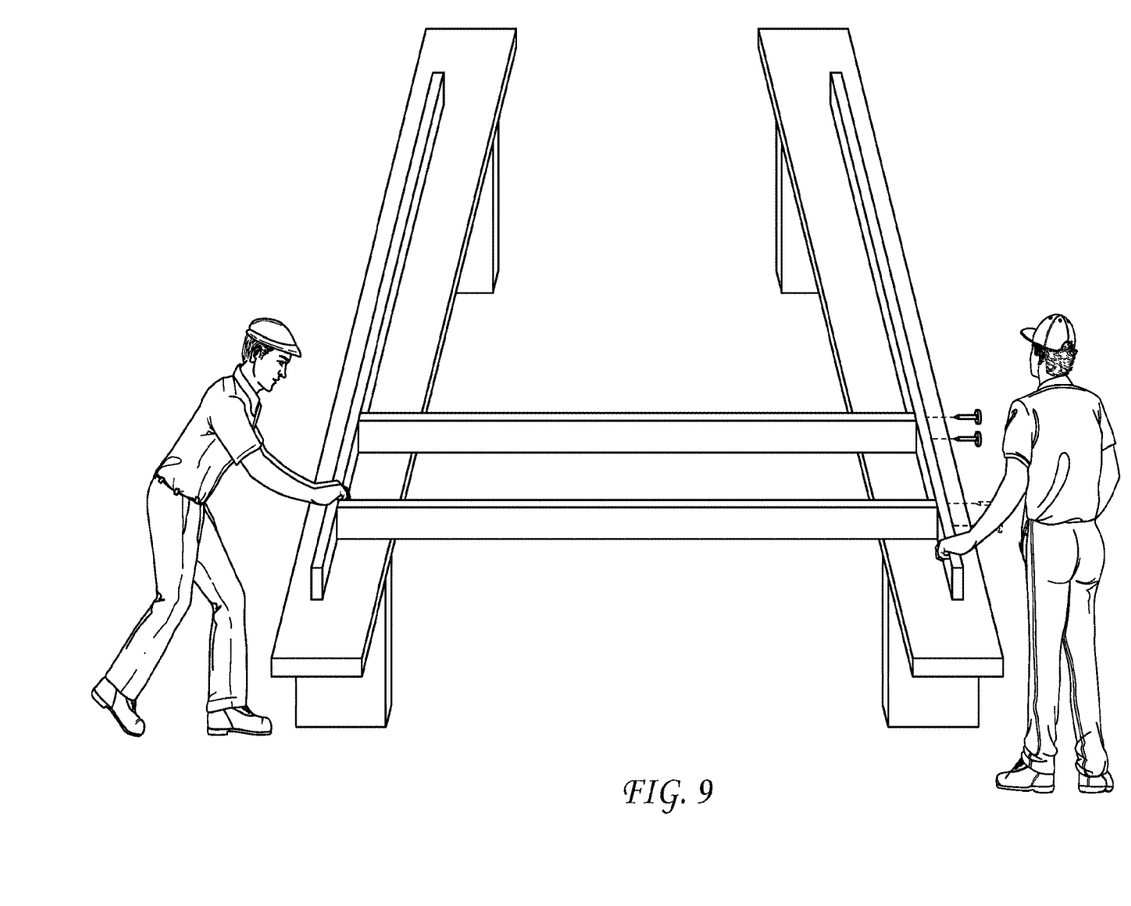
FIG. 9 is a stylized view of two workers using the framing system to build a panel according to selected embodiments of the current disclosure.

FIG. 9 is a stylized view of two workers using the invention to build a panel on a table. While the invention can be used on flat surfaces such as floors, other embodiments of the current disclosure provide a table upon which the panel can be constructed.

Figure 10:
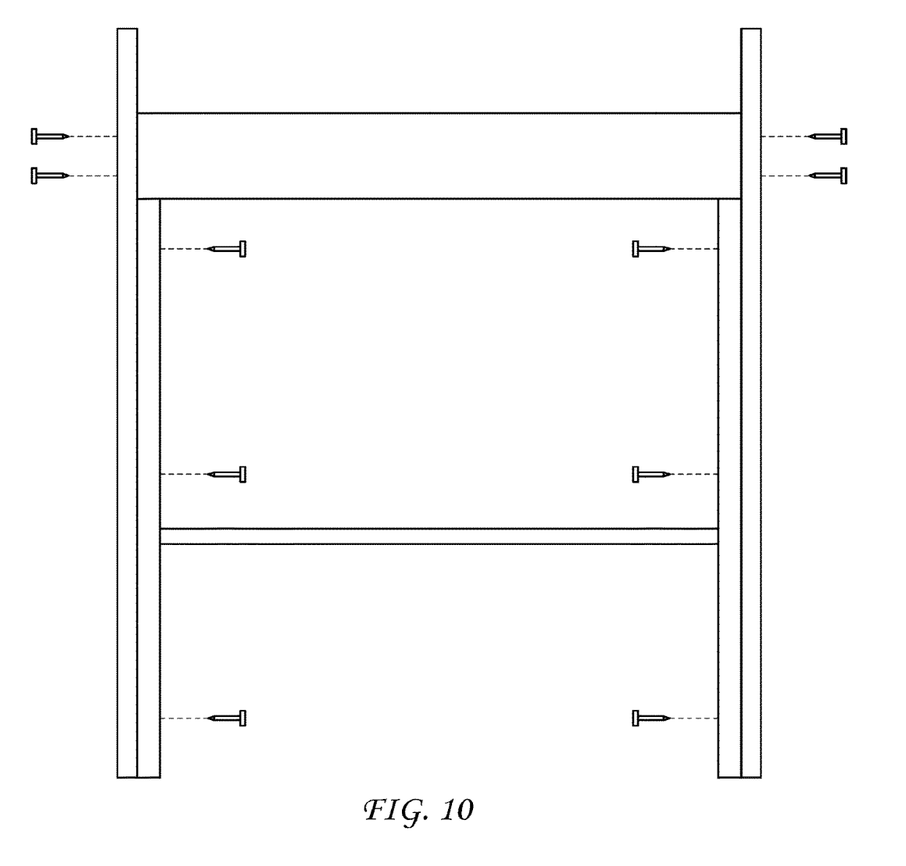
FIG. 10 is a stylized view of how a header is incorporated into a framing panel according to selected embodiments of the current disclosure.

FIG. 10 is a stylized view of how a header is incorporated into the invention. The specifications for headers can be found on the tape, such that a builder utilizing the invention can rely upon the tape rather than blueprints to determine the location of headers and other items.

Wall panels, and indeed walls themselves, which are created using the systems and methods disclosed herein, are "tilted up" into position. While one embodiment of this invention calls for individual panels to be built on a flat surface, such as the ground or a framing table (portable and non-portable options exist), embodiments disclosed herein are equally applicable to the "tilt-up" wall construction industry. This method of building is particularly popular with commercial buildings, but embodiments disclosed herein are particularly useful in constructing tilt-up walls that have a number of accessories, such as blocking, low-voltage boxes (used for television, internet, or security wiring), hold downs if they are require by code, plumbing appurtenances (could be PEX piping attachments), or most anything that may be required to be put in the wall. The point is that the builder using the template will not even need to look at the blueprints to be sure that all parts are installed in the wall in the proper location. Wall templates for different size studs such as 2×4, 2×6, or 2×8 walls will have templates that are printed on wider paper to fit the size of the studs in the wall.

In certain embodiments, templates are printed on a printer and then shipped to a construction destination. A builder receives the templates and rolls them out to tell the builders where to locate each part of a panel. The panel is constructed and various panels, roofs and other items buildable through this invention are put together to create a house or other structure.

Furthermore, the template or pattern can be used in different industries besides the residential building industry; for example, the commercial building industry. Additionally, embodiments of the current disclosure can be used for purposes beyond constructing walls. The systems and methods disclosed herein can be used with many materials, and the indicia on the template can be applied in different ways, with color- and number-coding, or even 3-D printing technology creating templates with some areas raised slightly.

Although this invention applies well to assembly of residential walls it can also be used to assemble components for commercial, industrial, military structures, and even sheds, mini-homes, micro-homes, bath houses, tea houses, doll houses, barns, out houses, and other structures. The technology is also applicable to construction units other than walls. For example, the templates or patterns can be used to assemble floor, roof, partition, or sub-assemblies, and can be used with a variety of materials, including but not limited to wood, metal, plastic, laminated materials, or any others.

It is also contemplated that there are several other ways to print indicia. Besides printing indicia, icons, and figures onto paper, cardboard, Mylar, vinyl, cloth, canvas, or other dimensionally stable material, it can be imprinted directly onto the materials being assembled such as the bottom and top plate of a wall to show the builder where and how to construct the assembly.

As building codes evolve and require new ways to construct buildings, the templates can be changed accordingly, without deviating from the scope of the current disclosure. Energy Codes continue to modify the way buildings are built that may affect assembly means, methods, and materials. New materials are developed to be used in the assembly of structures that will need to be included in the indicia on the templates or patterns.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What is claimed is:

1. A method of constructing a panel comprising the steps of applying a tape along the length of a bottom plate, where the tape comprises indicia for placement of studs, a header, and fasteners;
    applying a second tape along the length of a top plate, where the second tape comprises indicia for placement of studs, a pre-build header, and fasteners;
    fastening the studs to the bottom plate according to the indicia on the tape; fastening the studs to the top plate according to the indicia on the second tape; and fastening the pre-build header to the bottom plate according to the indicia on the tape,
    where the panel comprises a top plate, a bottom plate, a plurality of studs, a header, a plurality of fasteners, a wall surface, and a tape, wherein the tape comprises a first half and a second half, where each half comprises stud placement indicia, wall surface placement indicia, header placement indicia, and a fastener placement indicia, where the first half is attached to the top plate, and where the second half is attached to the bottom plate, where the stud placement indicia are mirrored between the first half and the second half.

2. The method of claim 1, wherein the fastener placement indicia comprises anchor bolt placement indicia in the second half, and where the fastener placement indicia does not comprise anchor bolt placement indicia in the first half.

3. The method of claim 2, wherein the fasten placement indicia comprises nailing instructions.

4. The method of claim 3, wherein each half of the tape further comprises cripple and sill placement indicia.

5. The method of claim 4, wherein each half of the tape further comprises electrical box placement indicia.

6. The method of claim 5, wherein the header is a pre-build header.

7. The method of claim 6, wherein the wall surface is an oriented strand board.

8. The method of claim 7, wherein each half of the tape further comprises backing board placement indicia.

9. The method of claim 8, where the tape further comprises a distortion-resistant material selected from the group consisting of Mylar, vinyl, paper, and cloth.

10. A method of making a tilt-up wall panel comprising a wall surface, a pre-build header, a plurality of fasteners, a top plate, a bottom plate, and a tape, wherein the tape comprises two halves separated by a line, where each half comprises color-coded indicia, where the color coded indicia comprises stud placement indicia, wall surface placement indicia, pre-build header placement indicia, and fastener indicia, where the fastener placement indicia comprises nailing instructions, where one of the two halves is attached to the top plate, and where the other of the two halves is attached to the bottom plate, where the stud placement indicia are mirrored between each of the halves, where at least one of the two halves further comprises anchor bolt placement indicia and electrical box placement indicia, where the panel comprises a top plate, a bottom plate, a plurality of studs, a header, a plurality of fasteners, a wall surface, and a tape, wherein the tape comprises a first half and a second half, where each half comprises stud placement indicia, wall surface placement indicia, header placement indicia, and fastener placement indicia, where the user of the invention attaches the first half to the top plate, and then attaches the second half to the bottom plate, where the stud placement indicia are mirrored between the first half and the second half, and where the fastener placement indicia comprises anchor bolt placement indicia in the second half, and where the fastener placement indicia does not comprise anchor bolt placement indicia in the first half, and wherein the fastener placement indicia comprises nailing instructions, and wherein each half of the tape further comprises cripple and sill placement indicia, and wherein each half of the tape further comprises electrical box placement indicia, and wherein the header is a pre-build header, and wherein the wall surface is an oriented strand board, and wherein each half of the tape further comprises backing board placement indicia, and where the tape further comprises a distortion-resistant material selected from the group consisting of Mylar, vinyl, paper, and cloth.

* * * * *